J. A. OLSON.
MANURE SPREADER.
APPLICATION FILED MAY 6, 1913.

1,088,613.

Patented Feb. 24, 1914.

2 SHEETS—SHEET 1.

WITNESSES
George Bambay
B. Joff

INVENTOR
JOHN A. OLSON
BY Munn & Co.
ATTORNEYS

J. A. OLSON.
MANURE SPREADER.
APPLICATION FILED MAY 6, 1913.
1,088,613.
Patented Feb. 24, 1914.
2 SHEETS—SHEET 2.
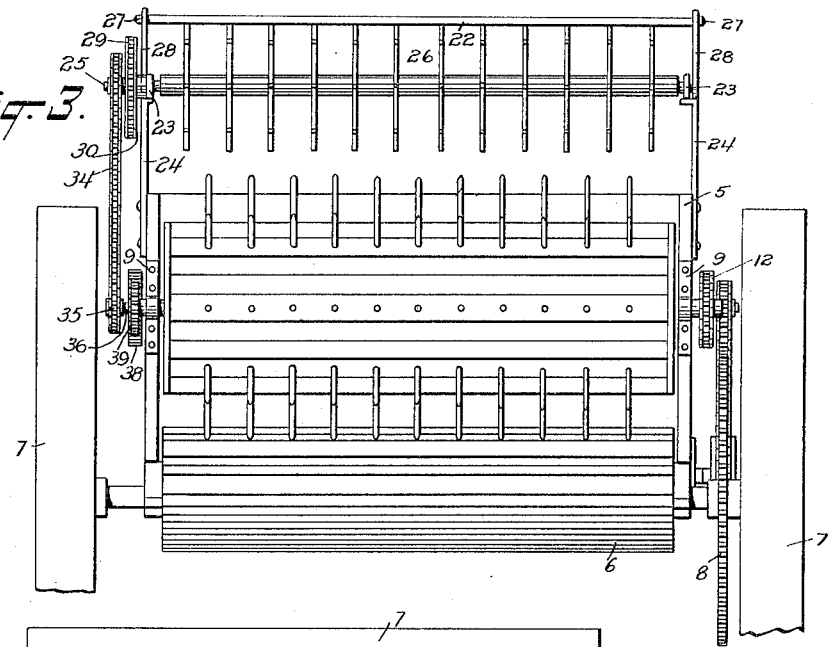
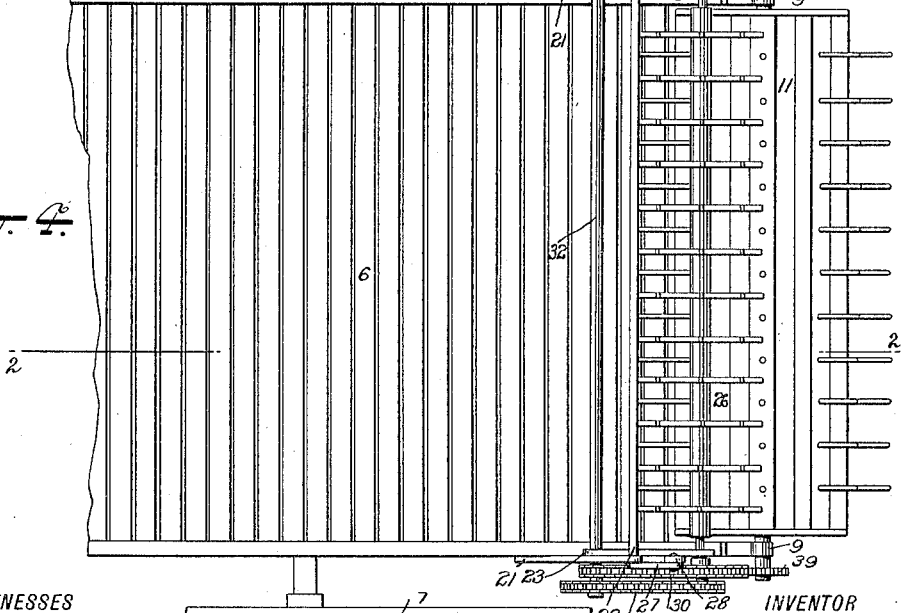
WITNESSES
George Bamburg
B. Joffe
INVENTOR
JOHN A. OLSON
BY
ATTORNEYS

UNITED STATES PATENT OFFICE.

JOHN A. OLSON, OF HILDRETH, NEBRASKA.

MANURE-SPREADER.

1,088,613.

Specification of Letters Patent. Patented Feb. 24, 1914.

Application filed May 6, 1913. Serial No. 765,767.

*To all whom it may concern:*

Be it known that I, JOHN A. OLSON, a citizen of the United States, and a resident of Hildreth, in the county of Kearney and State of Nebraska, have invented a new and Improved Manure-Spreader, of which the following is a full, clear, and exact description.

My invention relates to manure spreaders, and has reference more particularly to the class comprising a pair of spreaders the distance between which is automatically varied by the material passing between the spreaders.

An object of the invention is to provide an inexpensive, strong and reliable manure spreader in which the pressure produced on the spreaders by the material passing between them is automatically adjusted.

Another object of the invention is to provide a manure spreader with which straw as well as heavy manure can be as efficiently spread without any change in the spreading parts.

Figure 1:
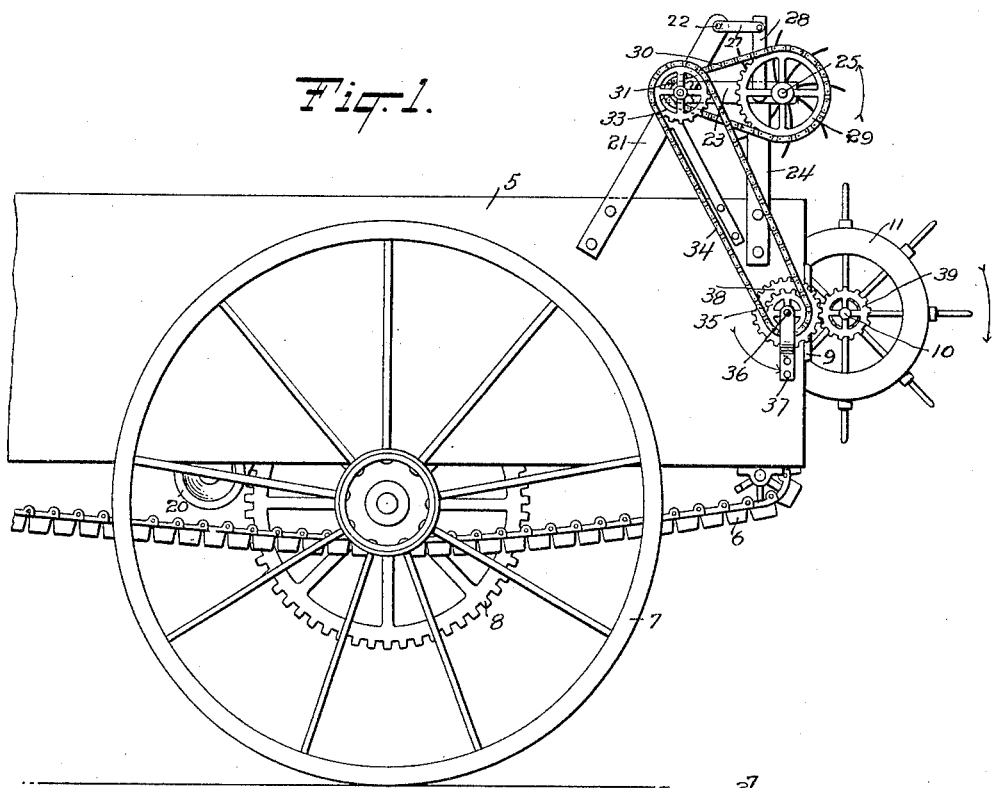
Figure 2:
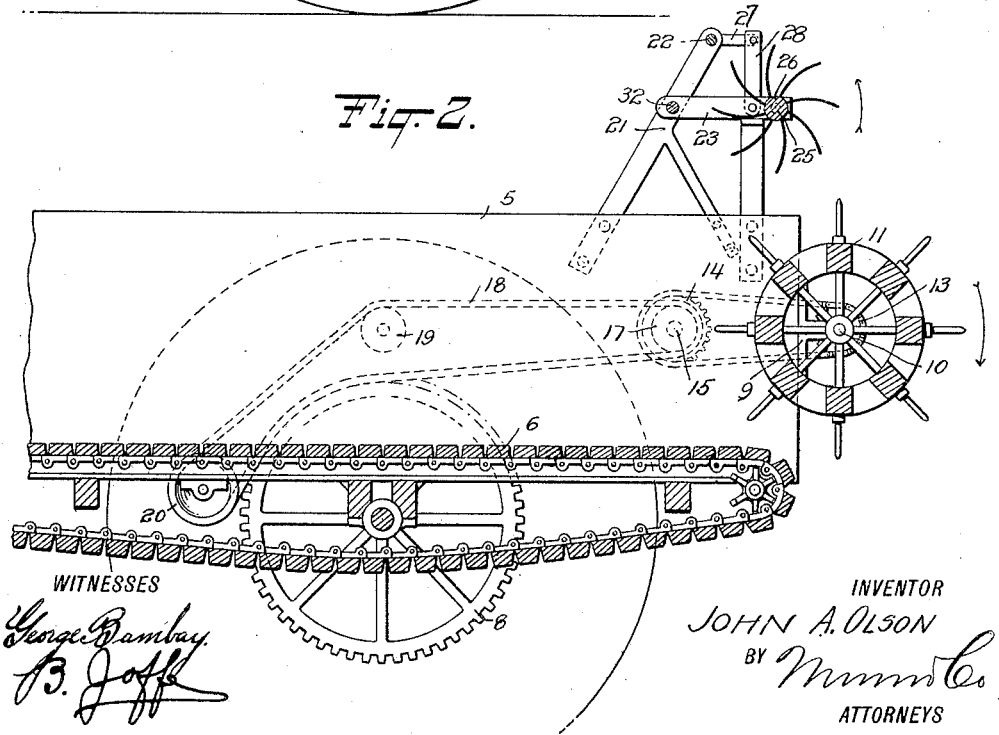

Reference is to be had to the accompanying drawings forming a part of this specification, in which like characters indicate corresponding parts in all the views and in which:

Figure 1 is a side elevation of a rear portion of a manure spreader embodying my invention; Fig. 2 is a section on line 2—2, Fig. 4; Fig. 3 is a rear elevation of the manure spreader; and Fig. 4 is a plan view of the same.

Referring to the drawings, 5 represents a receptacle or box-body resembling the body of a wagon. The bottom 6 of this receptacle is a conveyer, which is adapted to support the material to be spread. The receptacle 5 is supported on wheels 7, one of which is provided with a sprocket wheel 8. The rear ends of the sides of the receptacle 5 are provided with bearing blocks 9 in which journals a shaft 10. Rigidly secured to the shaft 10 is a spreader 11 disposed transversely of the open rear end of the receptacle 5. A sprocket 12 is secured to the end of the shaft 10 on the side of the wagon where the wheel is provided with a sprocket 8.

An endless chain 13 leads from the sprocket 12 to a sprocket 14 secured to a stub-shaft 15 journaling in a bracket 16 secured to the side of the wagon. A second sprocket 17 is secured to the stub-shaft 15, which is engaged by an endless chain 18. One side of the endless chain 18 engages the sprocket 8, while the opposite side of the chain is caused to pass over a tension device 19. The endless chain 18 is also made to engage a guide pulley 20 secured to the side wall of the receptacle 5 adjacent the sprocket 8. From the above it can be seen that when the wheel on which the receptacle is mounted is caused to rotate, the sprocket wheel 8 transmits its rotary motion to the spreader 11 by means of the endless chains 13 and 18.

A support 21 is secured to each side of the receptacle 5 adjacent the end of the same. The upper ends of the supports are connected by a tie bolt 22, thereby strengthening the said ends. Pivotally secured to each of the supports 21 is an arm 23, the non-pivoted end of which is directed toward the end of the receptacle 5. A standard 24 secured to each of the sides of the receptacle 5 supports the arm 23 adjacent the non-pivoted end. Journaling in the non-pivotal ends of the arms 23 is a shaft 25 to which is rigidly secured a spreader 26 positioned between the arms 23. The arm 23 is connected to the upper end of the support 21 by means of a pair of pivotally connected links 27 and 28, the link 27 being pivotally secured to the tie bolt 22 and the link 28 being pivotally secured to the arm 23 adjacent the shaft 25.

A sprocket 29 is secured to the end of the shaft 25 lying on the side of the receptacle opposite the one provided with the mechanism for driving the spreader 11. An endless chain 30 connects the sprocket 29 with the sprocket 31 mounted on the end of a shaft 32 journaling in the supports 21 and on which the arms 23 are pivotally mounted. Secured to the same end of the shaft 32 is a second sprocket 33, which is engaged by an endless chain 34 connecting the sprocket 33 with a sprocket 35 mounted on a stub-shaft 36 journaling in a bracket 37 secured to the side of the receptacle 5 adjacent the end of same. The stub-shaft 36 is provided with a cogwheel 38 rigidly secured thereto and meshing with a cogwheel 39 rigidly secured to the end of the shaft 10 on which the spreader 11 is mounted.

The spreader 26, which receives its rotary motion from the spreader 11 by means of the transmission above described, makes a lesser number of revolutions per unit of time than the spreader 11, as can be seen from Fig. 1. The reason for this is to retard the forward motion of the upper layers of the material fed to the spreaders by the conveyer 6. The conveyer 6 may be actuated continuously or intermittently, as desired, by means of a mechanism not disclosed, as not forming a part of my invention. The material located on the conveyer 6 in the receptacle 5 is generally not evenly distributed on same, and also not very homogeneous, consequently, when the same is fed by the conveyer to the spreaders 11 and 26, the same amount does not pass between the conveyers at all times. This condition would cause an uneven distribution of material on the ground by the spreaders, and it also would increase the resistance to the animals propelling the manure spreader, if the spreader 26 had been made fixed instead of floating, that is, mounted as described. With this provision of a floating spreader 26, when a large amount of material is advanced by the conveyer 6 toward the spreaders, the material engaged by the two spreaders will cause an excessive resistance. The excess will raise the spreader 26 from the standard 24, thus automatically adjusting itself to normal resistance. It is understood that the normal resistance is substantially equal to the weight of the arms 23, links 27 and 28, chain 30, and spreader 26; this weight varying with different sizes of spreaders. The advantage of my device is striking in connection with the use of same for spreading straw, which can be loaded very high above the bottom of the receptacle 5. This straw when fed by the conveyer 6 toward the spreaders 26 and 11 is forced by the spreader 26 toward the spreader 11, that is, from the top downward.

Having thus described my invention, what I claim as new and desire to secure by Letters Patent is:

1. In a manure spreader, a receptacle for material to be spread; a revoluble spreader secured to said receptacle; supports at the sides of the receptacle adjacent said spreader; an arm pivotally secured to each of said supports; standards secured to said receptacle normally supporting said arms; a second spreader mounted in said arms; a link connection between each support and arm; means for revolving said spreaders in a fixed relation; and means for feeding the material in the receptacle toward said spreaders.

2. In a manure spreader, a receptacle for material to be spread; a revolving spreader secured to said receptacle; supports at the sides of the receptacle; an arm pivotally secured to each of said supports; standards on said receptacle normally carrying said arms; a second spreader mounted in said arms; two links at substantially right angles to each other, one connected to the arm and the other to the support on which said arm is pivotally mounted; and means for feeding the material in the receptacle toward said spreaders.

In testimony whereof I have signed my name to this specification in the presence of two subscribing witnesses.

JOHN A. OLSON.

Witnesses:
HENRY JOHNSON,
M. C. BARRY.

---

Copies of this patent may be obtained for five cents each, by addressing the "Commissioner of Patents, Washington, D. C."